No. 794,921. Patented July 18, 1905.

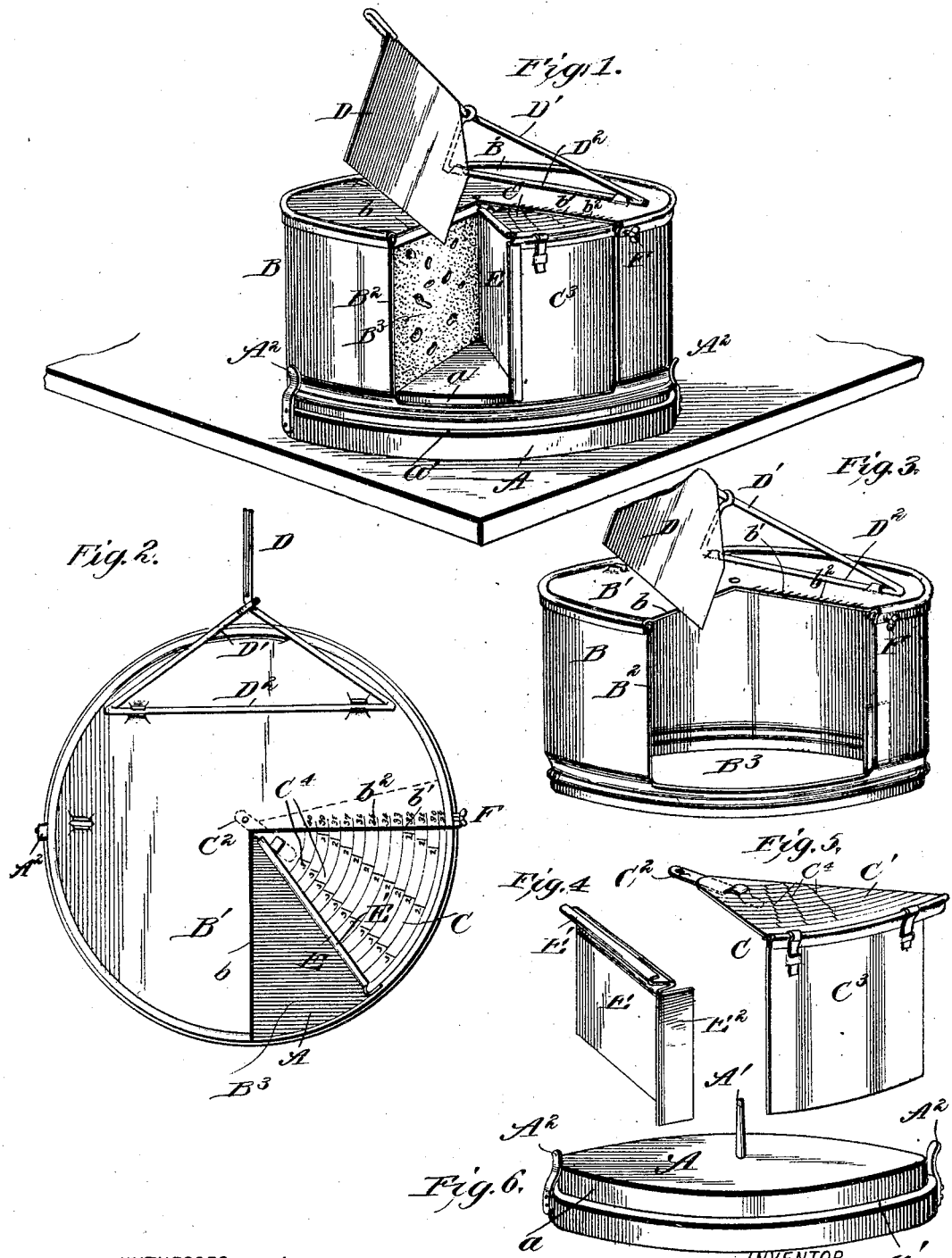

UNITED STATES PATENT OFFICE.

BURR BLOOD, OF CŒUR D'ALENE, IDAHO.

CHEESE-CUTTER.

SPECIFICATION forming part of Letters Patent No. 794,921, dated July 18, 1905.

Application filed March 9, 1904. Renewed November 17, 1904. Serial No. 233,220.

*To all whom it may concern:*

Be it known that I, BURR BLOOD, a citizen of the United States, residing at Cœur d'Alene, in the county of Kootenai and State of Idaho, have made certain new and useful Improvements in Cheese-Cutters, of which the following is a specification.

My invention is an improvement in cheese-cutters, and relates particularly to the devices in connection with the knife whereby to indicate accurately the amount of cheese to be cut from any bulk to secure a slice of any desired weight; and the invention consists in certain novel constructions and combinations of parts, as will be hereinafter described and claimed.

In the drawings, Figure 1 is a perspective view of a cheese-cutter embodying my invention. Fig. 2 is a top plan view thereof. Fig. 3 is a detail perspective view of the cutter with the blade connected. Fig. 4 is a detail perspective view of the guard-plate for protecting the cut cheese. Fig. 5 is a detail perspective view of the gage-section, and Fig. 6 is a detail perspective view of the base.

The base A may be provided with a central pin A' to receive the cheese and has its outer edge rabbeted at $a$ at its upper side to receive the lower edge of the cover B, which latter fits at its lower edge over the rabbeted portion $a$ of the base and rests upon the shoulder $a'$, being secured by the clamps $A^2$, so the cover can be turned upon the cheese, as will be understood from Figs. 1, 3, and 6 of the drawings. The cover B has the upright side portion and the top B' and is provided in one side with the segmental opening $B^2$, in which operates the gage-section C, presently described. The knife has the blade D and the bar D', the latter being pivoted at $D^2$ to the top B' of the cover B, so the blade D will swing alongside the edge $b$ of the segmental opening $B^3$ in one side of the cover B, the knife cutting flush along the said edge $b$, as shown in Figs. 1 and 3. Along the opposite edge $b'$ of the segmental opening $B^3$, I provide upon the top plate B' figures in series, as shown at $b^2$ in Fig. 2, to indicate the total weight of the cheese to be cut—in other words, the weight of the cheese before the latter has been cut—and these openings radiate from the center of the cover and gradually decrease, being shown as ranging from "40" to "29," this being sufficient to comprehend the range of cheeses ordinarily handled as merchandise.

The gage-section C has a top plate C', which in practice is pivoted by a suitable pin, as shown in Fig. 1 at $C^2$, at the center of the top plate B', the said plate C sliding beneath the edge $b'$ of the top B of the cutter. This gage-section C is also provided with a side plate $C^3$, depending from the outer edge of the plate C' and coinciding approximately with the circumferential portion of the cover B and aiding in forming a cover for the cut cheese in the use of the device. I also provide a guard-plate E (shown in detail in Fig. 4 and applied in Fig. 1 and arranged to be applied to the gage-section C, as shown in Fig. 1) to guard and protect one side of the opening in a cheese from which a portion of the cheese has been removed, the blade D being capable of adjustment to guard and protect the other side, as will be understood from Figs. 1 and 3 of the drawings. As shown, the guard-plate E is provided at E' and $E^2$ with grooved portions to fit the edges of the top plate C' and the side plate $C^3$ when the guard is applied, as shown in Fig. 1.

The top plate C' of the gage-section C is provided with a series of graduations arranged radially and extending circumferentially upon the face of the place C' and corresponding to the graduations $b^2$ on the cover-plate. These graduations $C^4$ on the gage-section indicate the extent to which said section should be moved beneath the top plate B' in order that the space between the outer edge of the plate C' and the opposite edge $b$ of the opening $B^2$ will be equal to the slice of cheese that should be cut in any particular instance to weigh one, two, or more pounds. Thus the graduations registering with the indication "40" on the plate B' will indicate the position of the gage-section in order to cut a slice of any desired weight from a cheese whose total weight was forty pounds. It will therefore be seen that this gage-section is provided with figures to indicate the amount of cheese to be cut, which figures correspond to the figures on the top plate of the main cover, which latter figures are the total weight of any particular cheese.

In operation when the parts are as shown in Fig. 1 to cut one pound the knife should be lifted and the section $c$ be turned until the figure "1" in the column corresponding to the figure on the main cover registers with the edge $b'$ of the top plate B'. The set-screw F should then be tightened to hold the gage-section C rigidly to the cover. The whole cover may now be turned until the cheese strikes the outer edge of the section C, when by cutting down to the base A a slice weighing one pound may be cut from the body of the cheese. If more than one pound is required, the gage-section should be adjusted until the figure corresponding to the amount of cheese wanted is registered with the edge $b'$, when the clamp may be tightened and the cheese cut, as before.

To place the cover on a cheese that has not been cut, the guard-plate may be removed and the cover, with the gage-section, applied. After one cut has been made through the cheese such cut can be adjusted to register with the edge $b$ of the opening $B^2$ and the gage-plate properly adjusted to indicate the desired extent of movement, after which the cover may be moved until the initial cut in the cheese registers with the outer edge of the top plate C' and the cheese be cut as before.

Having thus described my invention, what I claim as new, and desire to secure by Letters Patent, is—

1. A cheese-cutter substantially as described, comprising a base, a cover having a top plate and provided in one side with an opening and having along one edge of said opening a series of graduations to correspond with the total weight of a cheese to be cut, and a gage-section operating beneath the top plate of the cover-section and having a series of graduations readable in connection with the graduations on the cover, a clamp for securing said gage-section in different adjustments, a guard-plate for application to the outer edge of the gage-section, and a knife substantially as set forth.

2. The combination in a cheese-cutter, of a cover having an opening and a series of figures adjacent to one edge thereof and indicating the total weight of different cheeses, and a gage-section swinging concentrically with the cover and having a series of graduations readable in connection with the figures on the cover-plate, and indicating the extent of movement of the cover relative to a cheese to be cut substantially as set forth.

3. The combination with the cover having an opening and a knife carried by the cover and cutting alongside one edge of said opening, the cover being provided adjacent to the opposite wall of this opening with a series of figures corresponding to the total weight of different cheeses, and a gage-section movable relatively to such wall of the opening and having a series of graduations readable in connection with the numbers on the cover substantially as set forth.

4. A cheese-cutter having a cover provided with figures indicating the total weights of different cheeses, and a gage-plate movable relative to the cover and provided with a series of graduations readable in connection with the figures on the cover, and adapted to indicate the extent of movement of the cover relative to a cheese to be cut substantially as set forth.

5. The combination with the cover and the gage-section having a top plate and the outer side plate, of a guard-plate having means for engagement with the top plate and outer side plate of the gage-section, and the knife carried by the cover.

BURR BLOOD.

Witnesses:
 FRED L. BURGAN,
 JAMES L. McCLEAR.